United States Patent [19]

Tokumitsu et al.

[11] Patent Number: 4,833,665

[45] Date of Patent: May 23, 1989

[54] INFORMATION RECORDING CONTROL SYSTEM REUSING A DEFECTIVE AREA

[75] Inventors: Kenji Tokumitsu, Odawara; Takashi Doi, Hadano; Michio Miyazaki; Yuji Yamane, both of Odawara; Nobuyoshi Izawa, Tokyo; Toru Takeda, Kodaira, all of Japan

[73] Assignees: Hitachi, Ltd.; Nippon T & T, both of Tokyo, Japan

[21] Appl. No.: 65,839

[22] Filed: Jun. 23, 1987

[30] Foreign Application Priority Data

Jun. 27, 1986 [JP] Japan ................. 61-149558

[51] Int. Cl.⁴ .............................. G11B 7/00
[52] U.S. Cl. ..................... 369/58; 360/31; 360/53
[58] Field of Search ............ 360/47, 48, 55, 31, 360/53, 60; 369/53, 54, 32, 58; 371/10

[56] References Cited

U.S. PATENT DOCUMENTS

| 4,214,280 | 7/1980 | Halfhill et al. | 360/53 |
| 4,611,314 | 9/1986 | Ogata et al. | 369/32 |
| 4,631,723 | 12/1986 | Rathbun et al. | 360/47 |
| 4,730,290 | 3/1988 | Takasago et al. | 369/58 X |

FOREIGN PATENT DOCUMENTS

| 3403290 | 8/1985 | Fed. Rep. of Germany . |
| 59-165207 | 9/1984 | Japan . |
| WO85/01382 | 3/1985 | PCT Int'l Appl. . |

Primary Examiner—Robert L. Richardson
Attorney, Agent, or Firm—Fay, Sharpe, Beall, Fagan, Minnich & McKee

[57] ABSTRACT

Method for controlling information recording in an information recording apparatus which includes a rewritable information record medium containing a data record area having a plurality of data recording blocks and an alternative area in which data to be written into a defective block in the data record area is written, and writing and reading of data to and from the blocks and erasing of data may be carried out, wherein, data is written into the respective blocks in the data record area on the information record medium, and if a data record error is detected, data to be written into the defect block is written into a block of the alternative area. When data is subsequently rewritten, contents of all blocks in the data record area to be rewritten, including the block previously determined to be defective, are erased and the new data is rewritten, and the content of the alternative area is erased. If a data record error is detected after rewriting, the data to be written into the defect block is written into a block in the alternative area.

7 Claims, 4 Drawing Sheets ized and *c*annot be updated. As shown in Japa-

INFORMATION RECORDING CONTROL SYSTEM REUSING A DEFECTIVE AREA

BACKGROUND OF THE INVENTION

1. Field of the Invention

The present invention relates to a method for controlling information recording, and more particularly to a method for controlling information recording suitable for a erasable optical disk system.

2. Description of the Prior Art

In a prior art optical disk, information is recorded by forming small pits by irradiating a laser beam to a record film. Accordingly, once information is recorded, the information cannot be updated. As shown in Japanese Patent Unexamined Publication No. 59-165207, if a defect block is detected when information is recorded, the information for that block is recorded in an alternative area.

In a prior art magnetic disk apparatus, an alternative area is assigned to a defect area and a pointer to the alternative area is written in the defect area. Thus, when the defect area is accessed, the alternative area is pointed to by the pointer.

Recently, a erasable optical disk has been developed and writing of information into the optical disk and updating thereof are attainable. However, if a defect block is detected when the information is recorded, the information to be written into that defective block is written into an alternative block. The defect block is created by a permanent defect of the block as well as temporary defect in which recording is not correctly done, e.g., by deposition of dust. A percentage of the latter block detect is relatively high. In the optical disk, the defect block can be detected by reading data after it has been written in order to check whether the data has been correctly written. Even if it is a temporary defect due to the deposition of dust, it is detected as an error in recording in the same manner as the permanent defect. Once a block is detected to be defective, the data is recorded in an alternative region and no data is subsequently written into the defect area. As a result, the number of blocks in the alternative area increases, and a block which has been temporarily determined to be defective but can now correctly record the data is not used. Thus, the number of blocks in the alternative area increases monotonously every time the data is written.

SUMMARY OF THE INVENTION

It is an object of the present invention to provide a method for controlling information recording which suppresses the increase of the number of defect blocks and the number of alternative blocks.

In the present invention, if a data record error is detected when data is written onto an information record medium such as an optical disk, the data to be written into the defect block is written into an alternative area. When new data is to be written onto the information recording medium, data is sought to be recorded in data record areas, including the defect block previously detected to be defective, and the new data is written therein. If a data record error is detected when the new data is written, the data to be written into the defect area is written into the alternative area. The data recorded in the alternative area may be erased prior to the writing of the new data when the data is updated.

In accordance with the present invention, even if a block is determined to be defective, it may be used as a normal block if it can correctly record data when the data is updated thereinto. Accordingly, the increase of the total number of defect blocks is suppressed, the number of record blocks in the alternative area is reduced and the frequency of access to the alternative area is lowered.

DESCRIPTION OF THE PREFERRED EMBODIMENTS

An embodiment of the method for controlling information recording in accordance with the present invention will be explained with reference to the accompanying drawings.

Figure 1:
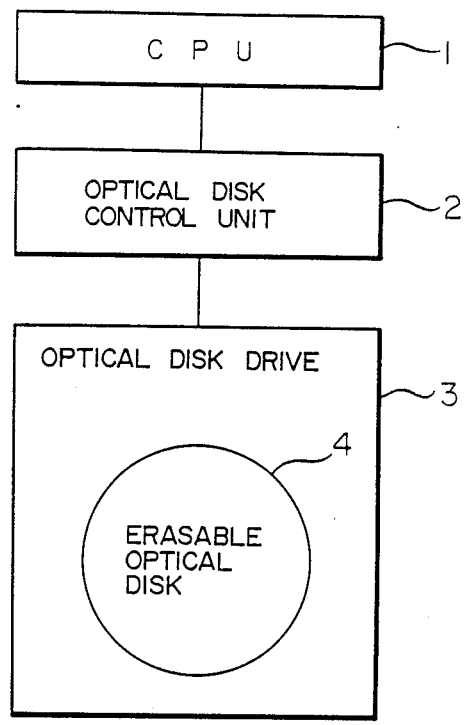
FIG. 1 shows a configuration of an erasable optical disk system.

FIG. 1 shows a configuration of an erasable optical disk system. An optical disk driver 3 contains an erasable optical disk 4 and erases, writes and reads data to and from the erasable optical disk 4. A CPU 1 is a host device to an optical disk control unit 2 which receives a command from the host CPU 1 to control the operation of the optical disk drive 3.

Figure 2:
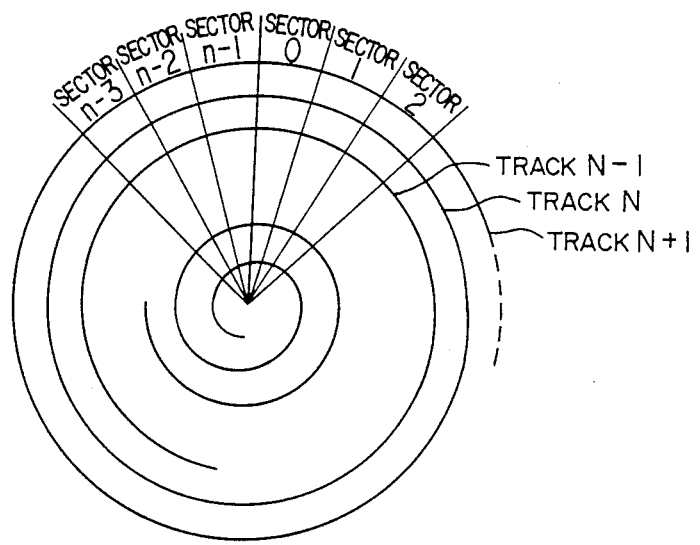
FIG. 2 shows a track format of the optical disk.

FIG. 2 shows a track format on the erasable optical disk 4. The track is spiral on the disk 4 and divided into a plurality of sectors. Information is recorded onto the disk 4 one sector at a time. The unit of information record is called a block.

Figure 3:
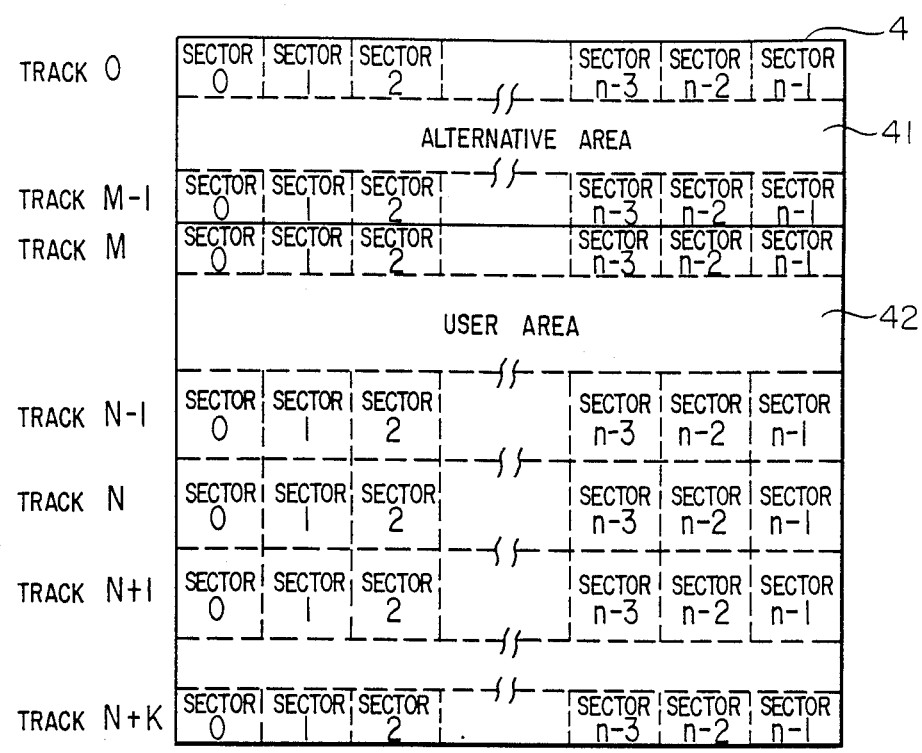
FIG. 3 illustrates allocation of a data area on the erasable optical disk.

FIG. 3 illustrates allocation of the data area on the erasable optical disk 4. Most portions thereof are a user area 42 in which data is recorded in a normal manner, and the rest is the alternative area 41. The alternative area 41 is used as an alternative record area for a write defect block in the user area 42.

In FIG. 3, tracks O to M−1 are arranged in the alternative area, tracks M to N+K are arranged in the user area and each track includes n sectors O to n−1. Data is recorded in each block comprising sectors in the user area, and identification information, that is, address information of a defect block and data to be written into that block are recorded in each block comprising sectors in the alternative area if a record error is detected in the block in the user area.

One embodiment of the method for controlling information recording of the present invention when information is recorded on the erasable optical disk will be explained.

Figure 4:
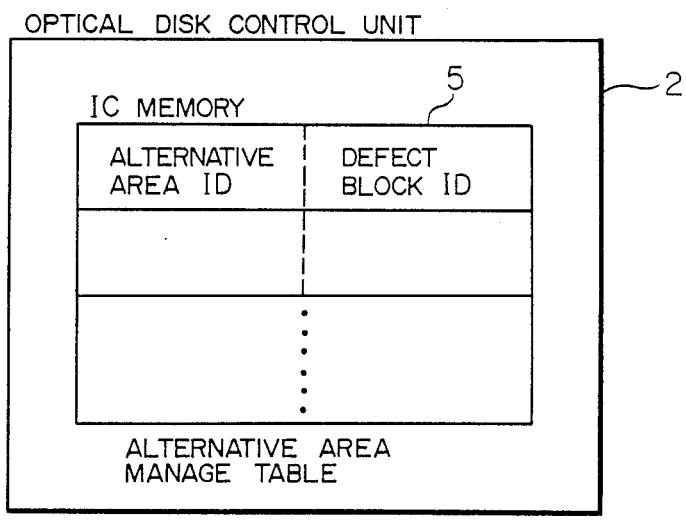
FIG. 4 shows an alternative area manage table.

When the erasable optical disk 4 is loaded to the optical disk driver, the control unit 2 reads the information in the alternative area 41 and prepares on an IC memory in the optical disk control unit shown in FIG. 4. An alternative area manage table 5 contains alternative area identification information. This is identification information or an address of a block in the alternative area 41 in which data to be written into a block in the user area, determined to be defective, is recorded with corresponding defect block identification information. The alternative area manage table allows a table look-up when information recorded in the optical disk is reproduced, without reading the information of the alternative area to determine the defect block in the alternative area so that a processing speed is raised, it although such is not essential.

Figure 5A:
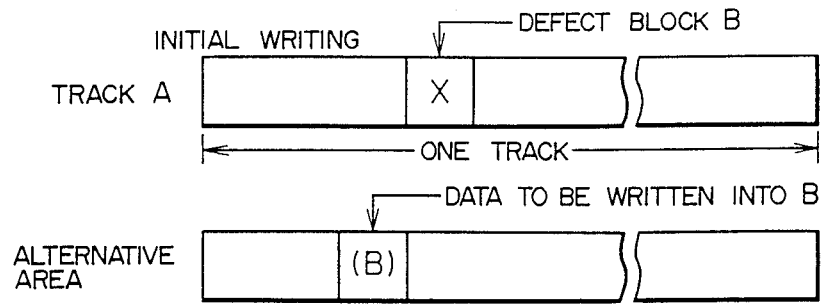
FIG. 5A shows a status of the data area of the optical disk at initial writing in information processing control of the present invention.

In the initial writing to the optical disk, if a record error block is detected after writing to a track A, as shown in FIG. 5A, the data to be written into the defect block B is written into the alternative area and alternative information is registered in the alternative area manage table 5.

When the block B is subsequentially detected to be defective in reading the track A, the alternative area manage table 5 is searched so that the address information of the alternative area corresponding to the defect block is rapidly looked up, and the backup by the alternative area is efficiently performed.

Figure 5B:
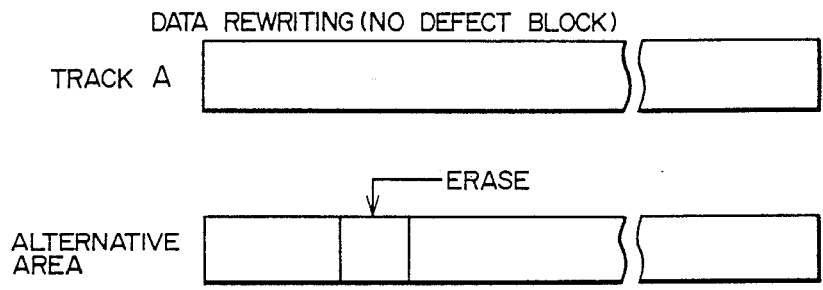
FIG. 5B shows a status of the data area when a defect block is not detected in data updating.

The rewriting or updating of data of the track A will be explained. To update data of the track A, old data in the user area, including the defect block B, is erased and new data is written. If no defect block is detected in the record error check after the updating of the data, the alternative area for the block B before the updating is erased, as shown in FIG. 5B. The registration of the erased alternative area is then deleted from the alternative area manage tale 5. The alternative area may be erased prior to the writing of the new data.

Figure 5C:
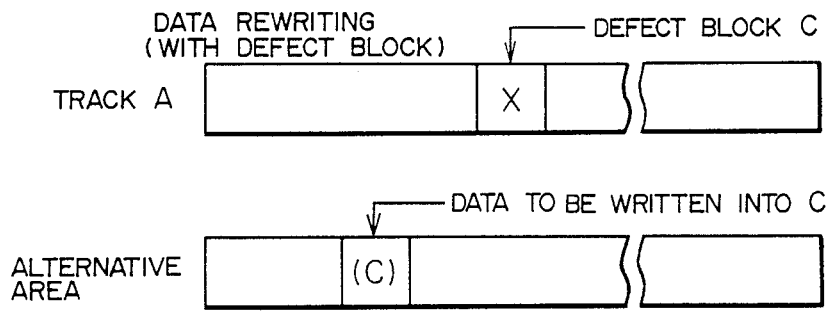
FIG. 5C shows a status of the data area when a defect block is detected in data updating.

If a defect block is detected in the rewriting updating of the data, the unnecessary alternative area is erased and the data to be written into the defect block is written into the alternative area, and new alternative area identification information and corresponding defect block identification information are written into the table 5. FIG. 5C shows an example where a block C is detected to be defective in place of the erased block B in updating the data.

If no defect block exists prior to the updating of the data and a defect block is detected after the updating of the data, or if the number of defect blocks increase as a result of updating, as many alternative areas as the number of additional defect blocks are written and registered in the alternative area manage table 5.

Figure 6:
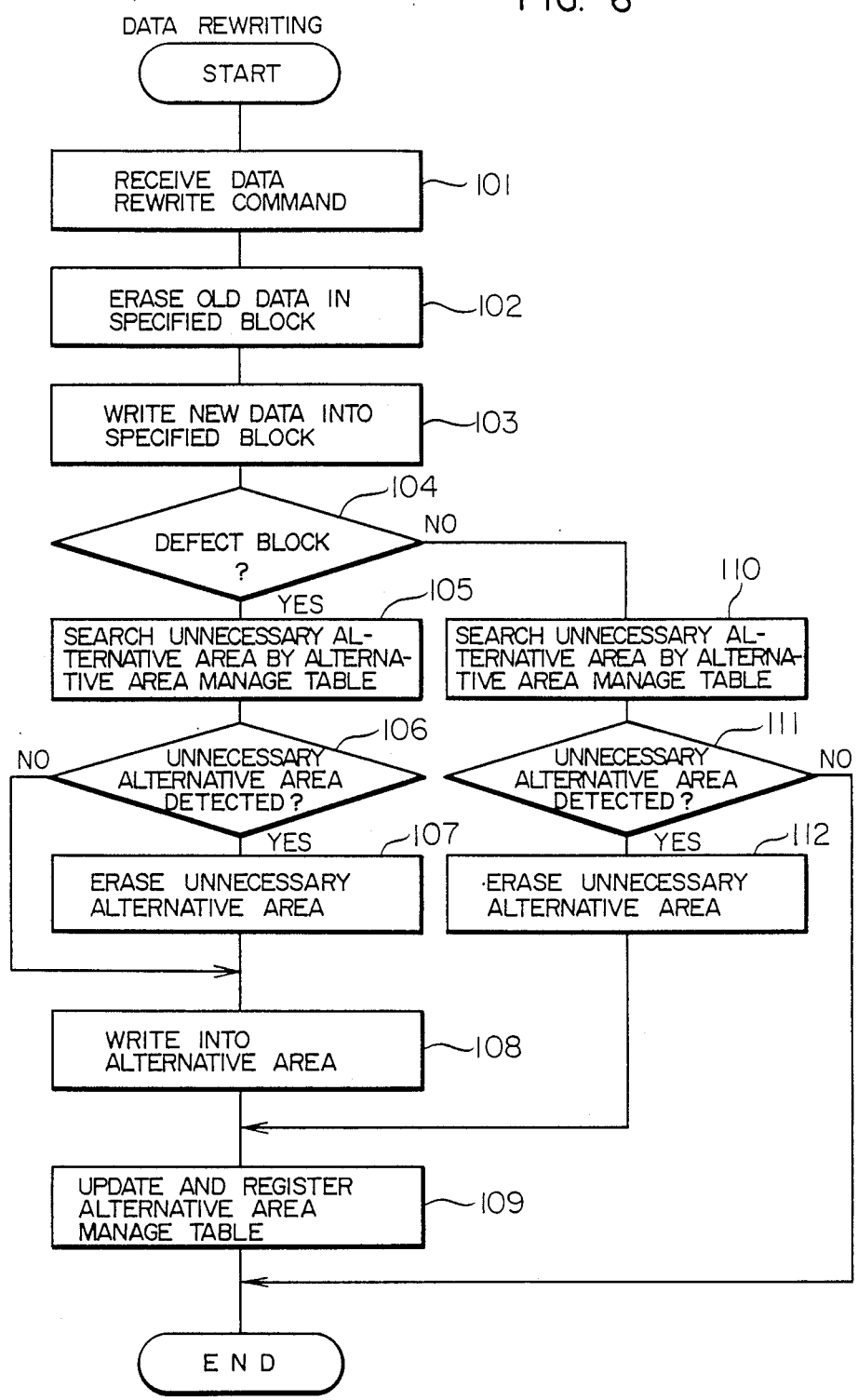
FIG. 6 shows a flowchart of data updating in one embodiment of the method for controlling information processing of the present invention.

FIG. 6 shows a flowchart of a data updating operation in the information processing control of the present invention in the optical disk system shown in FIG. 1. When the optical disk control unit 2 receives a data update command from the CPU 1 (step 101), the control unit 2 erases old data recorded in the block on the optical disk 4 specified by the data update command (step 102) and writes new data into that block (step 103). After writing, a record error is checked (step 104). If a defect block is detected, an alternative area which is no longer necessary as a result of data updating is searched by the alternative area management table 5 (step 105), and if the unnecessary alternative area is detected (step 106), the unnecessary alternative area is erased (step 107). If no unnecessary area is detected, new data to be written into the defect block and defect block identification information are written into an alternative area (step 108). The alternative area manage table is updated to include storage location identification information of the alternative area in which the new data has been written and the corresponding defect block identification information, and they are registered (step 109). If a defect block is not detected in the record error check after the updating of the data, an unnecessary alternative area is searched by the alternative area management table 5 (step 110), and if the unnecessary alternative area is detected (step 111), the unnecessary alternative area is erased if data for a defective block has been written therein (step 112), and the alternative area manage table 5 is updated (step 109). If no unnecessary alternative area is detected, the alternative area manage table is not updated.

As described above, in updating the data, data for the defect block is also updated and if it is determined to be normal after updating, it is used as a normal block unless it is again determined to be defective. Thus, to compare with a case where the defect block is not reused, the total number of defect blocks is reduced, the number of alternative areas used is reduced and the frequency of access to the alternative area is reduced.

While the information processing control of the present invention is applied to the optical disk system in the above embodiment, it is possible to apply the information processing control also to other information recording system such as a magnetic disk system.

What is claimed is:

1. A method for controlling information recording in an information recording apparatus including an erasable information recording medium having a plurality of tracks, each of which is divided into a plurality of blocks, and in which medium writing, reading, and erasing of data are carried out to and from said tracks, said information recording medium further including a user data record area having a plurality of blocks for data recording, and an alternate area having alternate blocks for backup of write defective blocks in said user data record area in which the writing of data has not been made correctly, said method comprising the steps of:

erasing contents of alternate blocks which have been used to record data for defective user blocks, if such alternative blocks exist, when updating data in the blocks in said user data record area and in above alternate blocks; and assigning alternate blocks as those in which to record data for user blocks, which user blocks were determined to be defective before updating, only when the user block s are determined to be defective after the updating.

2. The method for controlling information recording according to claim 1, wherein address information of the defective block of said data record area and the data to be written into the defective block are written into the block in said alternative area.

3. The method for controlling information recording according to claim 2 further comprising a memory for storing address information of the defective block and address information of the block in the alternative area in which the data to be written into the defective block is written, wherein the content of the block in the alternative area for the defective block is read by using the content of said memory instead of the content of said information recording medium.

4. A method for storing information comprising the steps of:
 (a) recording a data item in a user area of an erasable information recording medium having a plurality of tracks;

(b) testing accuracy of a recorded data item in the user area;
(c) detecting erroneous recording of the recorded data in the user area;
(d) marking the user area as defective;
(e) rerecording the data item in an alternate area of the recording medium;
(f) erasing the data item recorded in the alternate area; and
(g) repeating steps (a) through (b) for a subsequent data item.

5. The method of claim 4 further comprising the steps of:
(h) verifying as accurate the subsequent data item after recording thereof in the user area.

6. An rotating medium data storage apparatus comprising:
recording means for recording a data item in a user area or an erasable information recording medium;
verifying means for verifying accuracy of a recorded data item in the user area;
testing means for detecting erroneous recording of the recorded data in the user area;
marking means for marking the user area as defective;
recording means for rerecording the data item in an alternate area of the recording medium;
erasing means for erasing the data item recorded in the alternate area; and
the recording means including means for recording a subsequent data item in the user area;
the verifying means including means for verifying accuracy of a record subsequent data item;
the testing means including means for detecting one of a correct and erroneous recording of the subsequent data item in the user area.

7. The rotating medium data storage apparatus of claim 6 further comprising random access memory storage means for storing data representative of a defective user area.

* * * * *

UNITED STATES PATENT AND TRADEMARK OFFICE
CERTIFICATE OF CORRECTION

PATENT NO. : 4,833,665

DATED : May 23, 1989

INVENTOR(S) : Kenji Tokumitsu, et al.

It is certified that error appears in the above-identified patent and that said Letters Patent is hereby corrected as shown below:

On the title page:

Assignees: Hitachi, Ltd.; Nippon Telegraph and Telephone Corporation

Signed and Sealed this

Twenty-first Day of May, 1991

Attest:

HARRY F. MANBECK, JR.

*Attesting Officer*  *Commissioner of Patents and Trademarks*